United States Patent Office 3,106,883
Patented Oct. 15, 1963

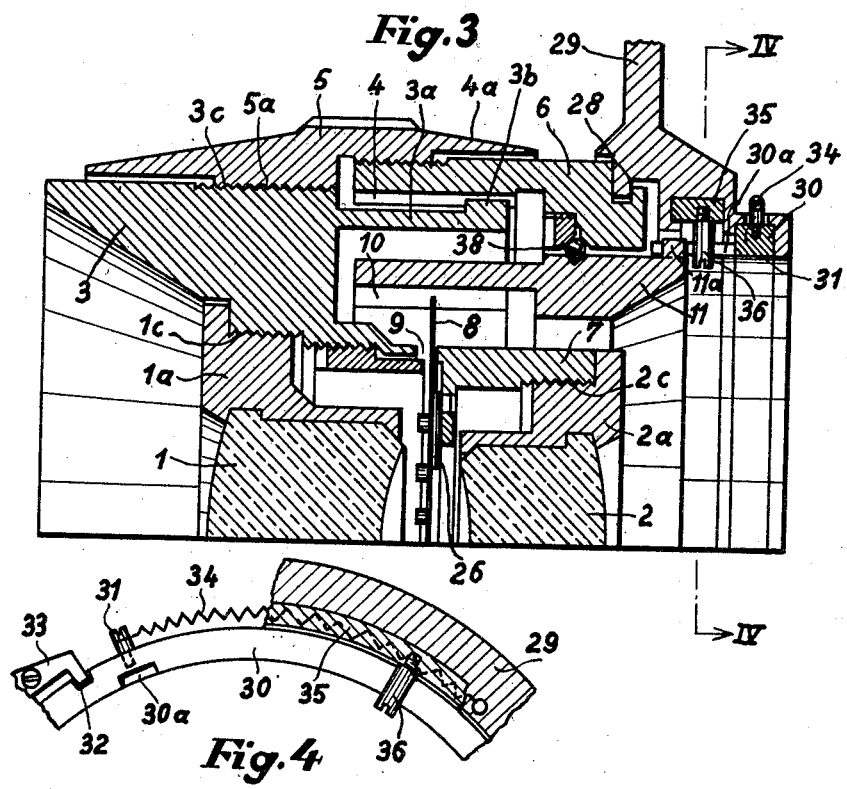
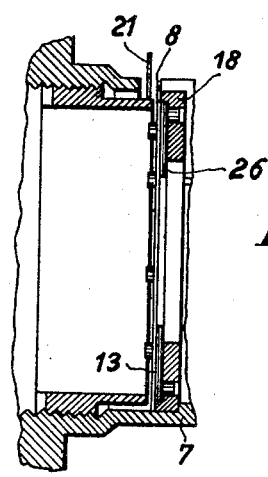

3,106,883
PHOTOGRAPHIC OBJECTIVES WITH DISTANCE ADJUSTMENT AND DIAPHRAGM ADJUSTMENT
Otto Erbe, Aalen, Germany, assignor to Carl Zeiss, Oberkochen, Wurttemberg, Germany
Filed Sept. 28, 1959, Ser. No. 842,790
Claims priority, application Germany Sept. 27, 1958
7 Claims. (Cl. 95—64)

The invention relates to improvements in photographic objectives with distance or focusing adjustment and diaphragm adjustment.

In conventional photographic or cinematographic cameras the diaphragm values indicate the ratio of the focal length to the diaphragm aperture diameter to which the diaphragm has been adjusted. These values, however, are only accurate and serve as a value for the amount of light which reaches the film in the picture window when the photographic objective has been adjusted to infinity. When the distance between the photographic objective and the subject to be photographed are shorter the distance between the film and the photographic objective will be increased and then the picture plane is displaced more and more beyond the focal plane and this results in a decrease in the illumination which reaches the picture window. When taking black and white pictures this difference in illumination can be tolerated because the light sensitive material has sufficient latitude in its exposure characteristic or exposure range, but when taking multi-colored pictures this difference in illumination may result in incorrect exposures unless a certain correction or compensation is made which usually amounts to an increase in the exposure time or in an increase in the aperture of the diaphragm.

The primary object of the invention is an improved photographic objective with focusing means and diaphragm aperture adjusting means in which during the focusing operation the diaphragm aperture is automatically corrected to such a value that the picture window illumination associated with any diaphragm value is independent of the distance to which the objective has been adjusted and this illumination remains always constant.

In focusing a reflex camera it is desirable to have the diaphragm open to the fullest extent so that maximum light may be obtained for focusing purposes. Before releasing the shutter of such a camera the diaphragm must be closed to a pre-selected adjustment of stop for correct exposure of the film.

There are known, e.g. from U.S. Patent 2,503,777 reflex cameras in which by moving an actuating lever the camera is conditioned for exposure in that the mirror is lowered to an operative position, the shutter blades are opened for focusing, the diaphragm is opened to its full extent for focusing and the shutter is set. This setting lever for conditioning the camera for an exposure can only be operated if a film-winding knob has first been turned to wind a fresh film area into place. After the focusing of the camera has been done pressure upon a release lever or a release button causes the following operations to take place. The shutter blades are closed; the diaphragm closes down to the preselected stop; the mirror moves upwardly into an inoperative position and the shutter trigger is pressed to make an exposure.

It is another object of the invention to provide an objective for such a reflex camera in which during the focusing operation the diaphragm aperture is automatically corrected so that after closing the diaphragm to the pre-selected stop the picture window illuminating is independent of the distance to which the objective has been adjusted.

The invention can be practiced in various manners and in the following will be described a few preferred embodiments with reference to the accompanying drawings wherein like reference characters denote like parts throughout.

FIG. 3 illustrates in a more or less diagrammatic manner an axial sectional view of a photographic objective for a reflex camera and of parts of this camera;

FIG. 4 is a sectional view of a detail along the line IV—IV of FIG. 3;

FIG. 8 is a sectional view of the diaphragm illustrated in FIG. 7 taken along line VIII—VIII.

Figure 1:
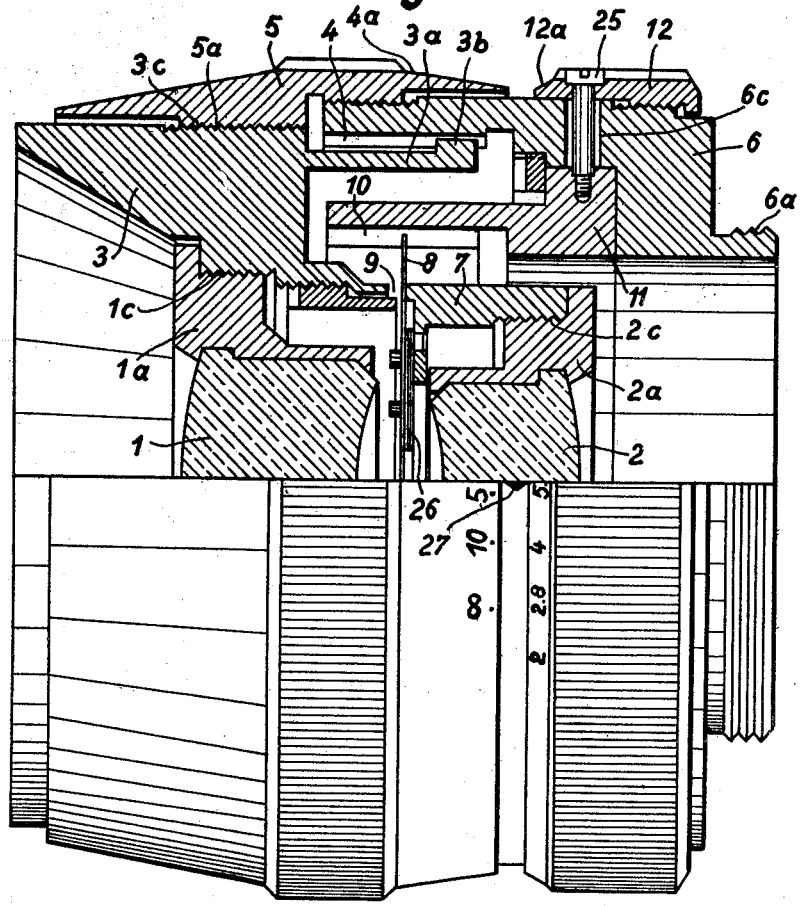
FIG. 1 illustrates in a more or less diagrammatic manner an axial sectional view of a photographic objective of the invention.

Referring to FIG. 1, the photographic objective consists of two axially aligned lens systems 1 and 2 of which the lens system 1 is arranged forwardly and faces the subject to photographed. Both lens systems 1 and 2 by means of their supporting rings 1a and 2a are mounted as shown by threads 1c and 2c in an annular objective mount 3. This mount 3 is provided with an axially extended lever 3a, which bears a pin 3b. This pin 3b engages an axially extended guide slot 4 arranged within a stationary mounting sleeve 6 which may be fixedly attached to the front wall of a camera casing by the thread 6a. The mount 3 is further provided with a thread 3c which for the purpose of axially adjusting the objective lens system 1, 2 for focusing is in threaded engagement with an interior thread 5a of a knurled cylindrical flange 5 arranged rotatably on said sleeve 6.

By rotating the flange 5 the mount 3 is axially displaced for focusing by means of the threads 3c, 5a and the guide slot 4 engaged by said pin 3b.

Rotatably adjusted to the sleeve 6 is further a knurled cylindrical ring 12 which bears the diaphragm scale 12a. The ring 12 is further provided with a screw 25 which passes through a slot 6c in the sleeve 6 and is fastened to a rotatably arranged sleeve 11. Thus by rotating the ring 12 the sleeve 11 is also rotated.

A diaphragm 26 is positioned between the lens systems 1 and 2 and is supported by an annular diaphragm support 7 forming an integral part of the objective mount 3. The adjusting ring 13 of the diaphragm 26 is provided with an outwardly extending arm 8 which extends through a slot 9 and projects into a high-pitched helical groove 10 provided on the inner wall of the sleeve 11.

The sleeve 6 is provided with a double-index 27 which serves for adjusting the diaphragm scale 12a and the distance scale 4a provided on the cylindrical flange 5.

If now the diaphragm is adjusted by rotating the ring 12, the arm 8 of the adjusting ring 13 is also rotated by means of the groove 10. Thereby the diaphragm aperture is adjusted according to the value indicated on the scale 12a. During this pure rotative movement of the sleeve 11 the axial position of the arm 8 in the helical groove 10 remains unchanged.

Figure 2:
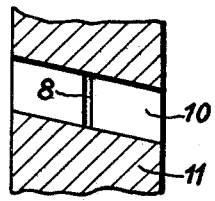
FIG. 2 is a sectional view of a detail along the line II—II of FIG. 1.

When now, however, by rotating the cylindrical flange 5 the focusing is performed the mount 3 is moved axially. During this pure axial movement of the mount 3 the axial position of the diaphragm adjusting arm 8 in the helical groove 10 is changed. The arm 8 on the ring 13 slides in the groove 10 and as illustrated in FIG. 2 effects a suitable correction of the diaphragm aperture according to the distance for which the objective has been adjusted.

As the amount of correction of the diaphragm aperture may be adjusted when the diaphragm is already adjusted to its greatest aperture it must be possible to rotatably adjust the diaphragm adjusting ring 13 to a value beyond the largest aperture in order to make the mentioned correction. For this purpose the diaphragm is developed as shown in one of the FIGS. 5–7. These figures will be explained hereinafter.

Referring now to FIG. 3 there is provided an objective for a reflex camera. The end of the mounting sleeve 6 of this objective is provided with a bayonet clutch 28 by means of which the objective is fixedly attached to the front wall 29 of the camera casing. The sleeve 11 is provided with radially extending pin 11a and is rotatably supported in the stationary mounting sleeve 6 by a ball bearing 38.

In the camera casing there is arranged rotatably an annular sleeve 30 with an axially extending lever 30a attached to it. This lever 30a engages with said pin 11a of the sleeve 11 and is coupled to an actuating ring—not shown here—by means of which the shutter and the diaphragm are opened when the camera is conditioned for exposure. When the diaphragm is opened to its full extent the lever 33 engages a groove 32 in said sleeve 30 thereby stopping this sleeve. By means of a pin 31 attached to the sleeve 30 there is fastened a spring 34 which tends to rotate the sleeve 30 clockwise (see FIG. 4) thereby closing the diaphragm.

Within the camera casing there is further arranged a rotatable ring 35 which is rotated when pre-selecting the diaphragm stop. This ring 35 is provided with a radially extending pin 36 which engages with said lever 30a when the diaphragm closes under the action of said spring 34.

The mode of operation of the embodiment illustrated in FIGS. 3 and 4 is as follows. When the camera is conditioned for exposure the ring 30 is rotated counter-clockwise until the lever 33 engages the groove 32. By means of the lever 30a and the pin 11a the sleeve 11 is thereby rotated. By this rotation the arm 8 of the diaphragm ring 13 is rotated by means of the groove 10 until the diaphragm is opened to its full extent. The spring 34 is tensioned by this rotation of spring 30.

Now the diaphragm stop is pre-selected by rotating the ring 35.

When now by rotating the cylindrical flange 5 the focusing of the objective is performed the mount 3 is moved axially. During this pure axial movement of the mount 3, the arm 8 of the diaphragm adjusting ring 13 slides in the helical groove 10 and effects a suitable correction of the diaphragm aperture according to the distance for which the objective has been adjusted.

When now the releasing lever of the camera is actuated the lever 33 is rotated until it slides out of the groove 32. By means of the spring 34 the ring 30 is now rotated clockwise until its pin 30a engages the stop 36 which represents the preselected diaphragm aperture. By the rotation of the ring 30 the sleeve 11 is also rotated thereby closing the diaphragm 26 to its preselected stop.

During this pure rotative movement of the sleeve 11 the axial position of the diaphragm adjusting arm 8 in the helical groove 10 remains unchanged, so that the diaphragm 13 is effectively closed down to an aperture which is equal to the preselected value but also includes the mentioned correction.

As explained in the foregoing, the amount of correction of the diaphragm aperture is adjusted already when the diaphragm is adjusted to its greatest aperture. This requires that it must be possible to rotatably adjust the diaphragm adjusting ring to a value beyond the largest aperture in order to make the mentioned correction.

Figure 5:
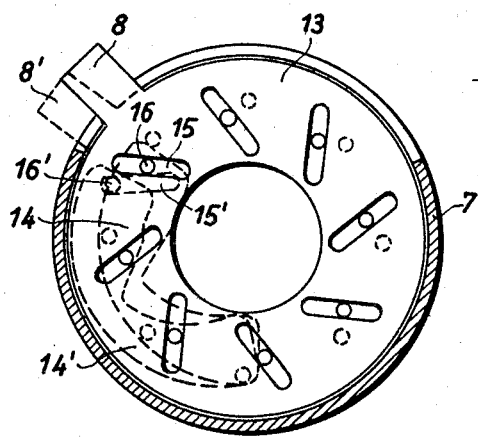
FIG. 5 illustrates a front elevation view of one form of a diaphragm which may be used in the camera objective of the invention.

The diaphragm illustrated in FIG. 5 allows said rotatable adjustment to a value beyond the largest aperture. The adjustment for the largest diaphragm aperture is shown in full lines. The respective positions of the guide slots 15 in the adjusting ring 13, which has the form of an annular disc, for the pins 16 on the diaphragm segments 14 are also shown in full lines.

If, for instance, during focusing of the photographic objective the arm 8 is rotated to the position 8′ then the angle between the full line position of the arm 8 and its dotted line position 8′ reflects the amount of correction of the diaphragm aperture for the change in the adjustment of the distance for which the camera objective has been adjusted. When the arm 8 reaches the dotted line position 8′, the guide slot has assumed the dotted line position 15′, the diaphragm segment assumes the dotted line position 14′ and the pin 16 has been shifted to the dotted line position 16′.

FIG. 5 indicates that this disclosed embodiment of the invention requires a relatively large diameter of the objective mount.

Figure 6:
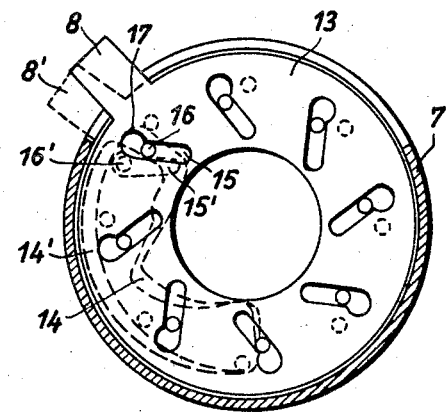
FIG. 6 illustrates in a front elevation view a somewhat modified diaphragm.

FIG. 6 illustrates an embodiment of the invention in which the space requirements are considerably reduced. The only difference of FIG. 6 over FIG. 5 resides in the shape of the guide slots 15 which in FIG. 6 are provided at one end with a lateral enlargement 17. In the correct position of the diaphragm the guide pins 16 will move into these enlargements 17 and when this occurs the diaphragm segments 14 will assume the positions 14′ shown in dotted lines in FIG. 6.

Figure 7:
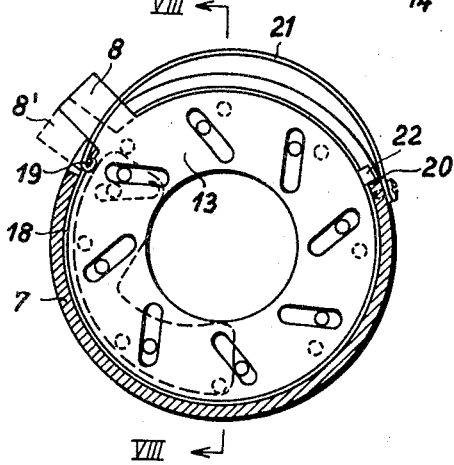
FIG. 7 illustrates in a front elevation view still another diaphragm which may be used in the camera objective of the invention.

In the embodiment of the invention illustrated in FIGS. 7 and 8 the diaphragm mount 18 is provided with a stop 19 against which rests the adjusting arm 8. The mount 18 is rotatably supported in the diaphragm support 7. During the focusing operation and the correction of the diaphragm aperture which is associated therewith the adjusting ring 13 and the diaphragm mount 18 rotate simultaneously, but without changing the diaphragm aperture which is determined by its inner limitation, when the diaphragm is opened to its full extent and the arm 18 rests on said stop 19.

A curved leaf spring 21 is attached with one of its ends to the diaphragm support 7 and with its other end to the diaphragm mount 18. The latter is provided with a further stop member 22.

When now the shutter of the camera is released the adjusting ring 13 and the diaphragm mount 18 are together rotated clockwise under the action of the leaf spring 21 until the stop member 22 engages the respective nose 20 of the support 7. Only when this position is reached the diaphragm starts to close. The angle of rotation determined by the two positions 8 and 8′ is therefore to be deducted from the extent of the closing movement of the diaphragm, so that the latter again is closed a distance or value which is only equal to the correction of the diaphragm. The diaphragm shown in FIGS. 7 and 8 also is distinguished by a very small space requirement.

The photographic objetcive of the invention is particularly suitable for reflex cameras with coupled exposure meters in which a photoelectric cell automatically controls the position of the diaphragm setting ring 35 with reference to a preselected shutter speed and the prevailing light conditions. A preferred field of application of the photographic objective of the invention is the field of color photography in which the films do have only a limited exposure range and should be exposed as correctly as possible in order to give good pictures.

What I claim is:

1. A photographic objective, a lens mount, lenses fixedly mounted in said lens mount in axially aligned position, a diaphragm support integrally formed with said lens mount and having an adjustable diaphragm attached thereto in axial alignment with said lenses, a stationary mounting sleeve, means for moving said lens mount in axial direction on said mounting sleeve during the focusing operation of the objective, means for adjusting the opening of said diaphragm, an annular sleeve arranged rotatably between said lens mount and said stationary mounting sleeve in an axially fixed position, said lens mount being moved in an axial direction relative to said annular sleeve when the lens mount is focused by said lens mount moving means, said annular sleeve being coupled to said diaphragm adjusting means and being provided on its inner wall with a helical groove, said diaphragm including a rotatable adjusting ring provided with an outwardly extending arm projecting through a slot in said lens mount and into said helical groove, whereby said diaphragm can be adjusted by said diaphragm adjusting means to a preselected position and upon axial adjustment of said lens mount said outwardly extending arm will slide in said helical groove and thereby correct the aperture of said diaphragm from its pre-selected position to a larger diaphragm opening position when the camera is focused for decreased distances.

2. A photographic objective, a lens mount, lenses fixedly mounted in said lens mount in axially aligned position, a diaphragm support integrallly formed with said lens mount and having an adjustable diaphragm attached thereto in axial alignment with said lenses, a stationary mounting sleeve, means for moving said lens mount in axial direction on said mounting sleeve during the focusing operation of the objective, a rotatably mounted diaphragm adjusting sleeve being provided with a radially extending pin and serving for preselecting the diaphragm stop, means for opening the diaphragm to its fullest extent when conditioning the camera to which said objective is attached for exposure, said means containing a first rotatably adjusted annular sleeve with a pin attached thereto and a spring tensioned when the diaphragm is opened, said spring acting on said annular sleeve, a second annular sleeve arranged rotatably between said lens mount and said stationary mounting sleeve in an axially fixed position, said second annular sleeve being provided with a pin which engages with said pin of said first annular sleeve and being provided on its inner wall with a helical groove, said adjustable diaphragm including a rotatable adjusting ring provided with an outwardly extending arm projecting into said helical groove, whereby upon axial adjustment of said lens mount said rotatably mounted adjusting ring is rotated to change the aperture of said diaphragm opened to its full extent, said first annular sleeve being released after the distance has been adjusted and the diaphragm stop has been preselected, said first annular sleeve thereby rotating under the action of said spring, whereby according to the connection of the pins the second annular sleeve is also rotated thereby closing the diaphragm until said pin on said first annular sleeve comes into engagement with said pin of said diaphragm adjusting sleeve.

3. A photographic objective according to claim 1, in which said rotatably mounted adjusting ring has the form of an annular disc which is provided with guide slots for pins on diaphragm segments, said guide slots having a shape for permitting an adjustment of said diaphragm to an aperture which is somewhat greater than the greatest aperture which is necessary.

4. A photographic objective according to claim 1, in which said rotatably mounted adjusting ring has the form of an annular disc which is provided with guide slots for pins on diaphragm segments, said guide slots having a sufficient length for permitting an adjustment of the diaphragm to a size somewhat greater than the greatest required aperture.

5. A photographic objective according to claim 1, in which said rotatably mounted adjusting ring has the form of an annular disc which is provided with guide slots for pins on diaphragm segments, said guide slots having a lateral enlargement at their outer ends for permitting an adjustment of said diaphragm to an aperture which is somewhat greater than the greatest aperture which is necessary.

6. A photographic objective according to claim 1, in which said diaphragm includes a mount rotatably adjusted within said lens mount and provided with a stop against which said outwardly extending arm comes to rest when said diaphragm has been adjusted to its greatest aperture so that said diaphragm mount and said diaphragm adjusting ring are rotated together upon an adjustment of said diaphragm to an aperture which is somewhat greater than the greatest aperture which is necessary.

7. A photographic objective according to claim 6, in which said lens mount is provided with a stop, said diaphragm mount being provided with a second stop and being connected with a spring which is also connected to said lens mount and acts to rotate said diaphragm mount back until its second stop comes to rest against said stop of the lens mount.

References Cited in the file of this patent

UNITED STATES PATENTS

| | | |
|---|---|---|
| 2,369,199 | Aiken | Feb. 13, 1945 |
| 2,549,230 | Parody | Apr. 17, 1951 |
| 2,777,371 | Schultz | Jan. 15, 1957 |
| 2,878,738 | Uhland | Mar. 24, 1959 |
| 2,925,765 | Gebele | Feb. 23, 1960 |
| 2,967,472 | Gebele | Jan. 10, 1961 |

OTHER REFERENCES

German application Z48991X/57a, Mar. 8, 1956.